(12) United States Patent
Hsu

(10) Patent No.: US 10,300,441 B2
(45) Date of Patent: May 28, 2019

(54) INJECTION MIXER

(71) Applicant: ASIA IC MIC-PROCESS, INC., Hsinchu (TW)

(72) Inventor: Hung-Hsin Hsu, Qionglin Township, Hsinchu County (TW)

(73) Assignee: ASIA IC MIC-PROCESS, INC., Hsinchu (TW)

( * ) Notice: Subject to any disclaimer, the term of this patent is extended or adjusted under 35 U.S.C. 154(b) by 281 days.

(21) Appl. No.: 15/471,330

(22) Filed: Mar. 28, 2017

(65) Prior Publication Data

US 2017/0354936 A1    Dec. 14, 2017

Related U.S. Application Data

(60) Provisional application No. 62/347,261, filed on Jun. 8, 2016.

(51) Int. Cl.
| | |
|---|---|
| *B01F 5/04* | (2006.01) |
| *B01F 13/02* | (2006.01) |
| *B01F 15/02* | (2006.01) |
| *B65D 88/70* | (2006.01) |
| *B65D 88/72* | (2006.01) |
| *B65G 53/22* | (2006.01) |

(52) U.S. Cl.
CPC ............ *B01F 5/0401* (2013.01); *B01F 13/02* (2013.01); *B01F 13/0261* (2013.01); *B01F 13/0266* (2013.01); *B01F 15/026* (2013.01); *B65D 88/703* (2013.01); *B65D 88/706* (2013.01); *B65D 88/72* (2013.01); *B65G 53/22* (2013.01)

(58) Field of Classification Search
CPC .... B65D 88/706; B65D 88/72; B65D 88/703; B01F 13/0261; B01F 13/0266; B01F 13/02; B01F 15/026; B01F 15/0201; B01F 5/0206; B01F 15/0298; B65G 53/22
See application file for complete search history.

(56) References Cited

U.S. PATENT DOCUMENTS

| | | | | |
|---|---|---|---|---|
| 2,084,546 | A * | 6/1937 | Ahlmann | B65G 53/00 366/106 |
| 2,353,346 | A * | 7/1944 | Logan | B65D 88/706 222/1 |
| 2,618,290 | A * | 11/1952 | Van Vliet | F25B 41/062 137/510 |
| 3,097,828 | A * | 7/1963 | Grun | B01F 13/0261 222/195 |

(Continued)

*Primary Examiner* — Tony G Soohoo
(74) *Attorney, Agent, or Firm* — Muncy, Geissler, Olds & Lowe, P.C.

(57) ABSTRACT

An injection mixer is provided, which includes an injection module, a valve seat module, and an adjusting module. The injection module may be disposed to penetrate one end of a bucket container. The valve seat module may be disposed at the end of the injection module, and the valve seat module may be disposed with at least one fluid supply channel and at least one outlet channel. The adjusting module may be disposed at the valve seat module to penetrate therethrough. The adjusting module may be movably connected to the injection module. When the adjusting module is driven to move the injection module towards or away from the valve seat module, an annular protrusion may approach or move away from the inner wall of the bucket container, and a size of the predetermined gap may be reduced or increased.

14 Claims, 4 Drawing Sheets

(56) References Cited

U.S. PATENT DOCUMENTS

| | | | | | |
|---|---|---|---|---|---|
| 3,343,888 | A * | 9/1967 | Anderson | B65D 88/706 | 406/138 |
| 3,386,182 | A * | 6/1968 | Lippert | B01F 13/0255 | 118/303 |
| 3,713,564 | A * | 1/1973 | Cottrell | B65D 88/706 | 222/1 |
| 3,840,155 | A * | 10/1974 | Frye | B65D 88/70 | 222/195 |
| 3,929,261 | A * | 12/1975 | Solimar | B65D 88/706 | 222/195 |
| 3,949,963 | A * | 4/1976 | Aoki | F16K 27/02 | 251/63.6 |
| 3,952,956 | A * | 4/1976 | Steele | B08B 5/02 | 239/289 |
| 4,030,755 | A * | 6/1977 | Heimke | B01J 8/44 | 222/195 |
| 4,172,539 | A * | 10/1979 | Botkin | B65D 88/706 | 222/195 |
| 4,189,262 | A * | 2/1980 | Anderson | B01F 13/0255 | 366/107 |
| 4,189,263 | A * | 2/1980 | Krug, Jr. | B65D 88/706 | 406/137 |
| 4,261,389 | A * | 4/1981 | Hager | B01J 4/001 | 137/625.38 |
| 4,400,131 | A * | 8/1983 | Blake | B60P 1/16 | 222/195 |
| 4,534,653 | A * | 8/1985 | Courtay | B65D 88/72 | 222/195 |
| 4,556,173 | A * | 12/1985 | Pausch | B65D 88/706 | 137/860 |
| 4,618,295 | A * | 10/1986 | Dugge | B65D 88/706 | 406/138 |
| 4,662,543 | A * | 5/1987 | Solimar | B65D 88/706 | 222/195 |
| 4,739,964 | A * | 4/1988 | Hutt | B65D 88/706 | 222/195 |
| 4,887,773 | A * | 12/1989 | Mehltretter | B02C 17/183 | 241/171 |
| 4,934,877 | A * | 6/1990 | Haverick | B65D 88/706 | 220/314 |
| 5,017,053 | A * | 5/1991 | Sisk | B01F 13/0255 | 366/101 |
| 5,129,553 | A * | 7/1992 | Becker | B65D 88/706 | 137/854 |
| 5,139,175 | A * | 8/1992 | Krysel | B65D 88/706 | 137/860 |
| 5,372,283 | A * | 12/1994 | Schmitkons | B01F 5/045 | 222/145.6 |
| 5,381,606 | A * | 1/1995 | Solimar | B65D 88/706 | 34/582 |
| 5,564,825 | A * | 10/1996 | Burt | B01F 3/0865 | 137/533.29 |
| 5,988,867 | A * | 11/1999 | Sisk | B65G 53/16 | 222/195 |
| 6,007,234 | A * | 12/1999 | Steele | B65D 88/706 | 239/533.14 |
| 6,170,976 | B1 * | 1/2001 | Sisk | B65D 88/706 | 222/195 |
| 6,237,893 | B1 * | 5/2001 | Rose | F16K 15/063 | 251/323 |
| 6,755,114 | B2 * | 6/2004 | Onoe | B65D 88/66 | 91/275 |
| 7,267,475 | B2 * | 9/2007 | Steele | B01F 3/18 | 366/101 |
| 7,731,411 | B2 * | 6/2010 | Pessin | B01F 3/18 | 366/106 |
| 8,066,425 | B2 * | 11/2011 | Boer | B01F 3/0807 | 138/43 |
| 8,087,816 | B2 * | 1/2012 | Sisk | B65G 53/22 | 222/195 |
| 8,449,170 | B1 * | 5/2013 | Jarvela | B65D 88/706 | 222/195 |
| 2017/0354936 | A1 * | 12/2017 | Hsu | B01F 5/0401 | |

\* cited by examiner

INJECTION MIXER

CROSS-REFERENCE TO RELATED APPLICATION

This application claims priority from U.S. Provisional Patent Application No. 62/347,261, filed on Jun. 8, 2016, at the United States Patent and Trademark Office, the content of which is hereby incorporated by reference in its entirety for all purposes.

BACKGROUND OF THE INVENTION

1. Field of the Invention

The present invention is related to a mixer. More specifically, the present invention is related to an injection mixer without mixing blades that is capable of mixing fluids thoroughly.

2. Description of the Related Art

Mixtures of fluids is widely utilizes in many industries. In some occasions, unwanted phenomena, such as sediments, oil-water segregation, or emulsification tend to take place in these fluids after being stored and left undisturbed for a prolonged period.

A conventional mixer usually mixes the liquids by means of rotating mixing blades, such that the particles in the liquids can be evenly distributed. However, the mixing blades can only stir the liquid in the vicinity thereof without stirring all of the particles in the liquid effectively. Therefore, the mixing blades are unable to evenly distribute the particles the liquid stored in the tank in an effective fashion. Besides, owing to different characteristics of the liquid, particles may clog up the mixing blades, which may make cleaning difficult after usage for an extended period of time.

Therefore, the inventor has invented an injection mixer, which aims to solve the problems identified above and improve practical utility.

SUMMARY OF THE INVENTION

In order to solve the problem identified above, an objective of the present disclosure is to provide an injection mixer.

As stated above, an injection mixer is provided, which may include an injection module, a valve seat module, and an adjusting module. The injection module may be disposed to penetrate one end of a bucket container. The edge of the injection module may protrude outwards to form an annular protrusion, and the annular protrusion may be separated from the inner wall of the bucket container by a predetermined gap. The injection module may be disposed with at least one injection channel and at least one fluid intake channel. The at least one injection channel may connect one side of the injection module and one end of the injection module, and the at least one fluid intake channel may connect the other end of the injection module and the end of the injection module. The valve seat module may be disposed at the end of the injection module, and the valve seat module may be disposed with at least one fluid supply channel and at least one outlet channel. The at least one fluid supply channel may connect one side of the valve seat module and one end of the valve seat module. The outlet channel may connect the other end of the valve seat module and the end of the valve seat module. The adjusting module may be disposed at the valve seat module to penetrate therethrough. The adjusting module may be movably connected to the injection module. When the adjusting module is driven to move the injection module towards the valve seat module, the annular protrusion may approach the inner wall of the bucket container, and a size of the predetermined gap may be reduced. When the adjusting module is driven to move the injection module away from the valve seat module, the annular protrusion may move away from the inner wall of the bucket container, and the size of the predetermined gap may be increased. The fluid supply channel may receive external fluid and then supply the external fluid to the injection channel, and the injection channel may supply the external fluid to the bucket container through the predetermined gap. When the fluid intake channel receive internal fluid from the bucket container, the fluid intake channel may transport the internal fluid to the outlet channel, and the outlet channel may discharge the internal fluid out of the valve seat module.

In a preferred embodiment, the injection mixer may further include a fixing module located between the end of the bucket container and the end of the valve seat module. The fixing module may surround the injection module and may be detachably connected to the bucket container and the valve seat module.

In a preferred embodiment, the fixing module may be a circular structure. The inner wall of the fixing module and a sidewall of the injection module may be separated by a predetermined distance.

In a preferred embodiment, the injection mixer may further include a washer component, which may be located between the fixing module and the valve seat module.

In a preferred embodiment, the adjusting module may include a transmission member and a driving member. The transmission member may have rod-like structure, and the transmission member may be disposed to penetrate the valve seat module and the injection module. One end of the transmission member may be movably connected to the injection module. One end of the driving member may be connected to the other end of the transmission member. When the driving member is driven to propel the transmission member to rotate in a first direction, the transmission member may in turn move the injection module towards the valve seat module, and the annular protrusion may approach the inner wall of the bucket container, such that the size of the predetermined gap is reduced.

In a preferred embodiment, when the driving member is driven to propel the transmission member to rotate in a second direction, the transmission member may in turn move the injection module away from the valve seat module, and the annular protrusion may move away from the inner wall of the bucket container, such that the size of the predetermined gap is increased.

In a preferred embodiment, the at least one injection channel may be disposed with a fluid intake opening and a fluid discharge opening. The fluid intake opening may be located at the end of the injection module, and the fluid discharge opening may be located at the side of the injection module.

In a preferred embodiment, the fluid supply channel may be disposed with a fluid supply opening and a fluid transporting opening. The fluid supply opening may be disposed at the side of the valve seat module, and the fluid transporting opening may be disposed at the end of the valve seat module.

In a preferred embodiment, the fluid transporting opening may protrude outwards to form an engagement portion that may movably engage the fluid intake opening.

In a preferred embodiment, the fluid intake channel may be disposed with a guiding entrance and a guiding exit. The guiding entrance may be disposed at the other end of the injection module, and the guiding exit may be disposed at the end of the injection module.

In a preferred embodiment, the at least one outlet channel may be disposed with an inlet and an outlet. The inlet may be disposed at the end of the valve seat module, and the outlet may be disposed at the other side of the valve seat module.

In a preferred embodiment, the inlet may protrude outwards to form an engagement member, and the engagement member may movably engage the guiding exit.

In a preferred embodiment, the end of the injection module and the annular protrusion may be an integrally formed structure.

In a preferred embodiment, the integrally formed structure may form a cone shape.

The injection mixer of the present disclosure may come with one or more advantages that are given below:

(1) In the injection mixer of the present disclosure, the injection module may be disposed at the bottom of the bucket container and there may be a predetermined gap between the inner wall of the bucket container and the injection module. Therefore, when the injection module supplies the fluid through the injection channel, the fluid may then be supplied to the bucket container through the predetermined gap as an injection stream, and the injection stream may stir and mix the fluid in the bucket. The injection mixer of the present disclosure is a convenient device that is capable of stirring the fluid efficiently, such that sediments may be avoided.

(2) With the predetermined gap between the injection module and the bucket container, the injection mixer may supply the fluid to the bucket container by means of injection stream, which causes the stirring and mixing effect of the fluid. Therefore, the injection mixer of the present disclosure is not only capable of mixing the fluid in the bucket thoroughly without the need for mixing blades, it can prevent the formation of vortex when the fluid is distributed from the bottom of the bucket too, and this reduces the tendency of accidentally mixing the air into the fluid.

(3) The injection stream of the injection mixer allows the fluid to be fed into the bucket container, such that no noise or vibration will be produced when the injection mixer is mixing the fluids, and the injection mixer can be kept in a steady position that can facilitate weighing of the fluids.

DESCRIPTION OF THE PREFERRED EMBODIMENTS

Figure 1:
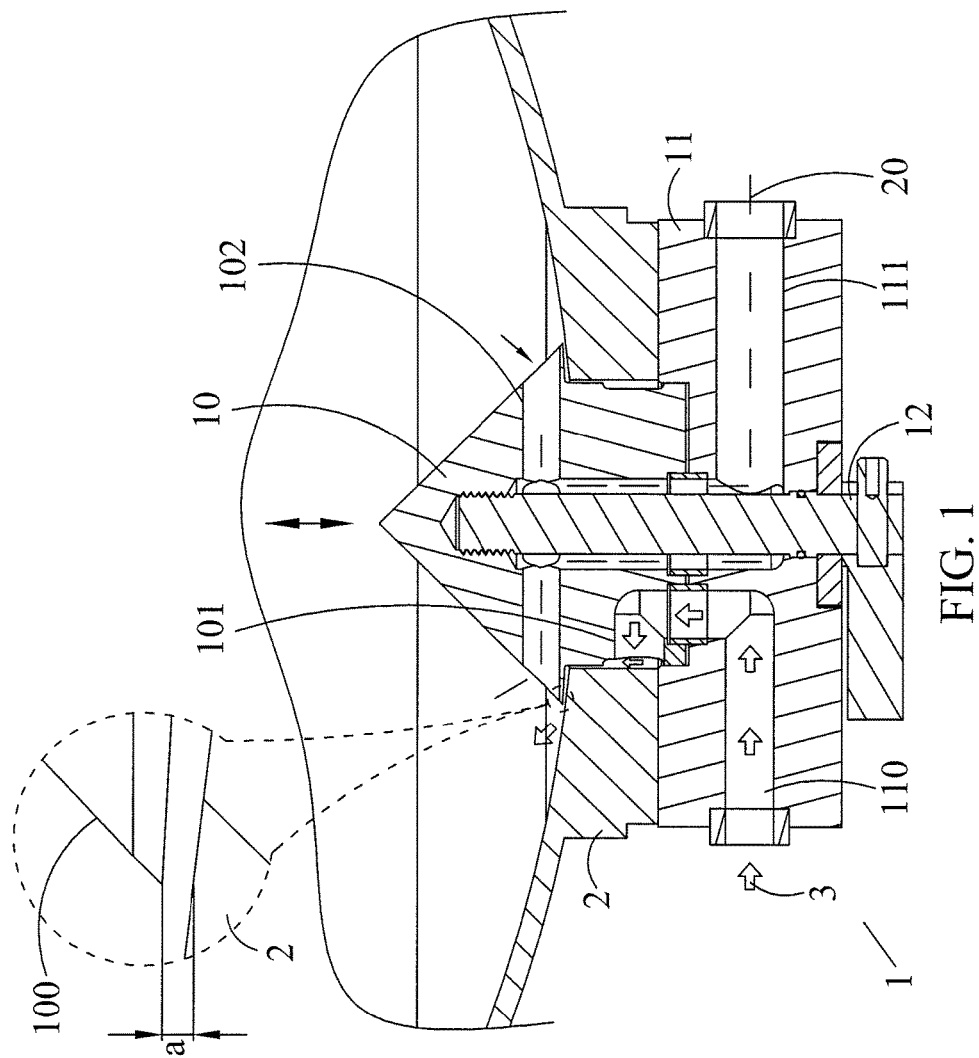
FIG. 1 is the first schematic diagram for the first embodiment according to the injection mixer of the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

Figure 2:
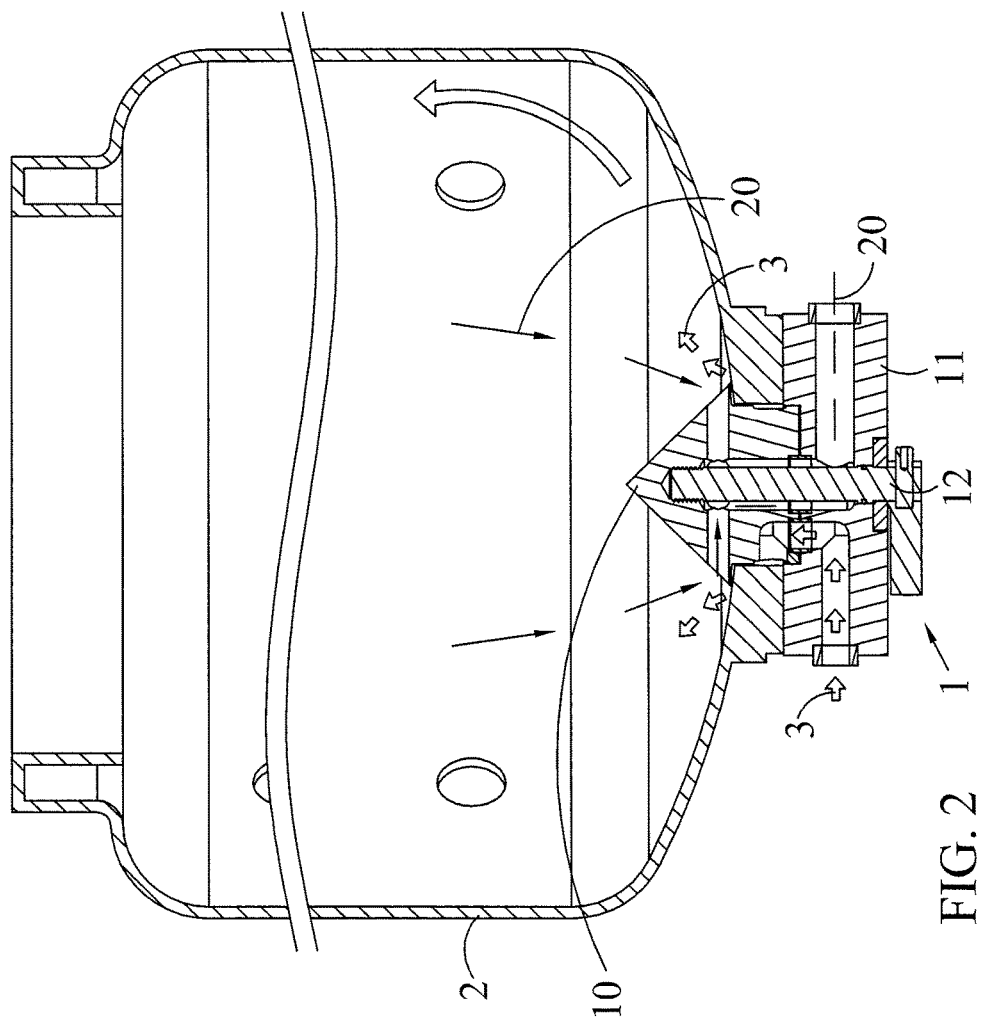
FIG. 2 is the second schematic diagram for the first embodiment according to the injection mixer of the present disclosure.

Referring to FIGS. 1 and 2, which are the first and second schematic diagrams for the first embodiment according to the injection mixer of the present disclosure. As shown in the diagram, the injection mixer 1 may include an injection module 10, a valve seat module 11, and an adjusting module 12. The injection module 10 may be disposed to penetrate one end of a bucket container 2. The edge of the injection module 10 may protrude outwards to form an annular protrusion 100, and the annular protrusion 100 may be separated from the inner wall of the bucket container 2 by a predetermined gap a. The injection module 10 may be disposed with at least one injection channel 101 and at least one fluid intake channel 102. The at least one injection channel 101 may connect one side of the injection module 10 and one end of the injection module 10, and the at least one fluid intake channel 102 may connect the other end of the injection module 10 and the end of the injection module 10. The valve seat module 11 may be disposed at the end of the injection module 10, and the valve seat module 11 may be disposed with at least one fluid supply channel 110 and at least one outlet channel 111. The at least one fluid supply channel 110 may connect one side of the valve seat module 11 and one end of the valve seat module 11. The outlet channel 111 may connect the other end of the valve seat module 11 and the end of the valve seat module 11. The adjusting module 12 may be disposed at the valve seat module 11 to penetrate therethrough. The adjusting module 12 may be movably connected to the injection module 10. When the adjusting module 12 is driven to move the injection module 10 towards the valve seat module 11, the annular protrusion 100 may approach the inner wall of the bucket container 2, and a size of the predetermined gap a may be reduced. When the adjusting module 12 is driven to move the injection module 10 away from the valve seat module 11, the annular protrusion 100 may move away from the inner wall of the bucket container 2, and the size of the predetermined gap a may be increased. The fluid supply channel 110 may receive external fluid 3 and then supply the external fluid 3 to the injection channel 101, and the injection channel 101 may supply the external fluid 3 to the bucket container 2 through the predetermined gap a. When the fluid intake channel 102 receive internal fluid 20 from the bucket container 2, the fluid intake channel 102 may transport the internal fluid 20 to the outlet channel 111, and the outlet channel 111 may discharge the internal fluid 20 out of the valve seat module 11.

More specifically, the present disclosure provides an injection mixer that is capable of mixing fluid thoroughly without the need for the mixing blades. The injection mixer 1 of the present disclosure may include an injection module 10, a valve seat module 11, and an adjusting module 12. The injection module 10 may be disposed to penetrate one end of a bucket container 2 and be separated from the bottom wall of the bucket container 2 by the gap. The edge of the injection module 10 may protrude outwards to form the annular protrusion 100, which is separated from the wall of the bucket container 2 by a predetermined gap a (such as 1-3 mm, preferably 2 mm). The valve seat module 11 may be located at one end of the injection module 10, and the adjusting module 12 may be disposed to penetrate the valve seat module 11 and be movably connected to the injection module 10. The injection module 10 may further be disposed with at least one injection channel 101 and at least one fluid intake channel 102. The valve seat module 11 may further be disposed with at least one fluid supply channel 110 and at least one outlet channel 111. The at least one injection channel 101 may connect one side of the injection module 10 and the fluid supply channel 110. The fluid intake channel 102 may connect the other end of the injection module 10 and the at least one outlet channel 111.

Therefore, when the injection mixer 1 is stirring the fluid inside the bucket container 2, the operator may guide the external fluid 3 into at least one injection channel 101 of the injection module 10 through at least one fluid supply channel 110. Then, the injection channel 101 may discharge the external fluid 3 out of the injection module 10, and the fluid will flow to the predetermined gap a through the gap between the injection module 10 and the bottom wall of the bucket container 2. Through the predetermined gap a, the fluid will then flow into the bucket container 2, and the injected stream will disturb the fluid at the bottom of the bucket container 2 to produce the stirring and mixing action. Subsequently, the internal fluid 20 inside the bucket container 2 may be guided to the at least one outlet channel 111 through the at least one fluid intake channel 102, such that the internal fluid may be discharged out of the valve seat module 11 through the outlet channel 111.

It is worth noting that during the course of injecting the external fluid 3 into the bucket container 2 through the predetermined gap a, whenever the intensity of the mixing effect is to be reduced, the adjusting module may be driven such that the injection module 10 may move away from the valve seat module 11, and the annular protrusion 100 may move away from the inner wall of the bucket container 2. Hence, the size of the predetermined gap a may be increased. During this time, the external fluid 3 in the gap is in low pressure, and the speed of the injection stream that drives the stirring and the mixing action is relatively lower.

Conversely, whenever the intensity of the mixing effect is to be boosted, the adjusting module 12 may be driven such that the injection module 10 may be moved towards the valve seat module 11, and the annular protrusion 100 may be moved towards the inner wall of the bucket container 2. Hence, the size of the predetermined gap a may be reduced. Therefore, the external fluid 3 in the gap is in relatively high pressure, and the external fluid 3 may flow into the bucket container 2 through the predetermined gap a at a higher speed. Therefore, the stirring and the mixing effect is relatively stronger.

Furthermore, the end of the injection module 10 and the annular protrusion 100 may be an integrally formed structure, and the integrally formed structure may form a cone shape. Therefore, the formation of sediments on top of the injection module 10 in the fluid inside the bucket container 2 may be avoided.

Figure 3:
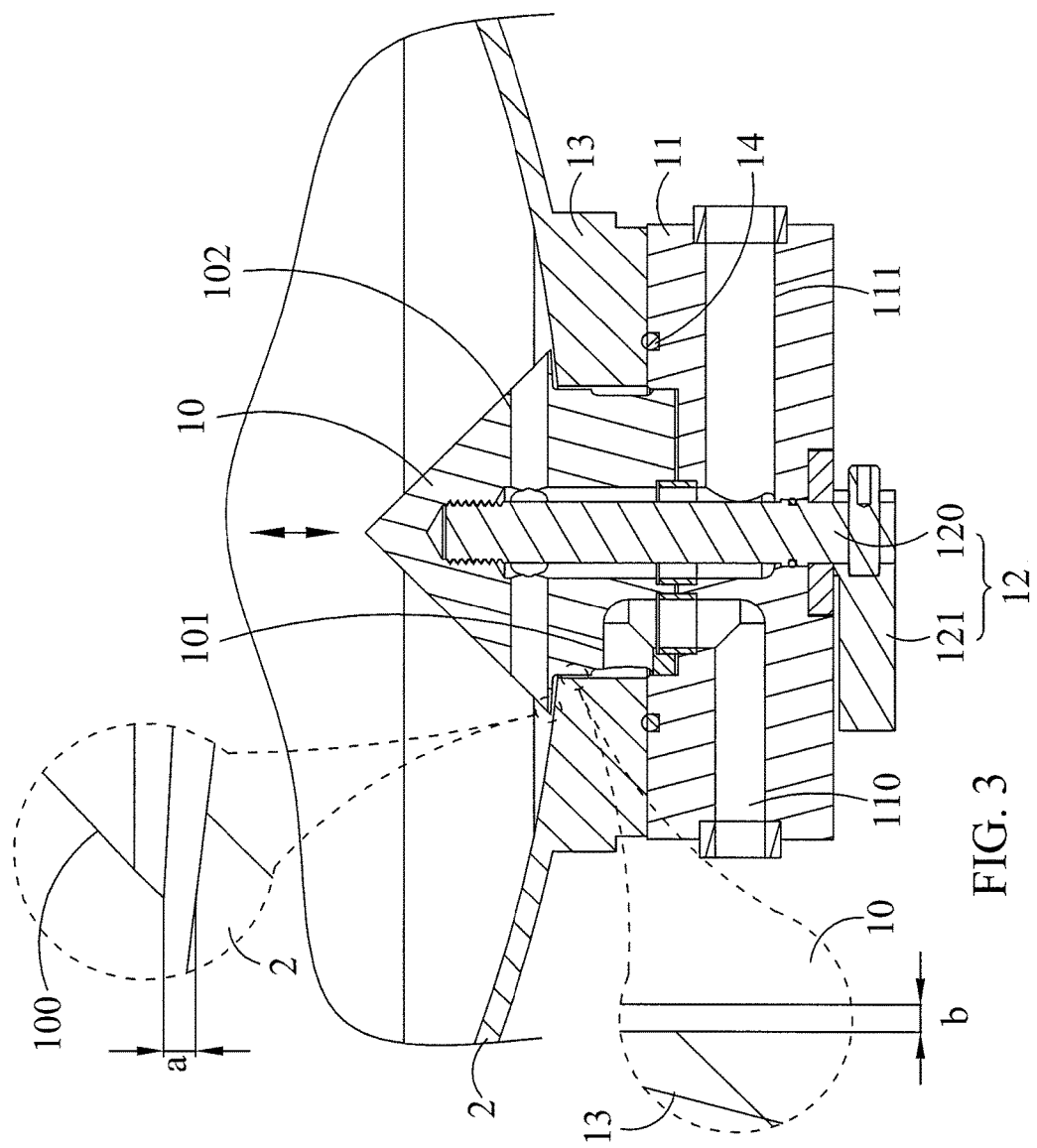
FIG. 3 is the schematic diagram for the second embodiment according to the injection mixer of the present disclosure.

The description below makes reference to FIG. 3, which is the schematic diagram for the second embodiment according to the injection mixer of the present disclosure. In the drawing, those components in the injection mixer of the present embodiment functioning in similar fashion as those of the previous embodiment are designated with similar labels, and hence their descriptions are omitted. However, it is worth noting that, in the present embodiment, the injection mixer 1 may further include a fixing module 13, which may be located between one end of the bucket container 2 and one end of the valve seat module 11. The fixing module 13 may surround the injection module 10 and may be detachably connected to the bucket container 2 and the valve seat module 11. Moreover, the fixing module 13 may be a circular structure. The inner wall of the fixing module 13 and the sidewall of the injection module 10 may be separated by a predetermined distance b.

For example, in the case that bottom of the bucket container 2 of the injection mixer 1 is thin, the injection mixer 1 may be further disposed with a fixing module 13, which may have a circular structure. The fixing module 13 may be located between the bucket container 2 and the valve seat module 11. The fixing module 13 may surround the injection module 10 and may be detachably connected to the bucket container 2 and the valve seat module 11 by any means of connection, e.g. locking or engagement, but the present embodiment is not limited thereto. The inner wall of the fixing module 13 may be separated from the sidewall of the injection module 10 by a predetermined distance b (such as 1-3 mm, preferably 2 mm) and form a gap. Therefore, when the injection mixer 1 is stirring the fluid inside the bucket container 2, the external fluid 3 may be guided into at least one injection channel 101 through at least one fluid supply channel 110, and then the injection channel 101 may inject the external fluid 3 into the gap, which then delivers the fluid to the predetermined gap a. Finally, the external fluid 3 may flow into the bucket container 2 via the predetermined gap a.

In addition, the injection mixer 1 may further include a washer component 14, which may be located between the fixing module 13 and the valve seat module 11. That is to say, the injection mixer 1 of the present disclosure may be further disposed with the washer component 14, which may be interposed between the fixing module 13 and the valve seat module 11, so as to prevent the leaking of the external fluid 3 or internal fluid 20 from the gap between the fixing module 13 and the valve seat module 11 during the transportation of the fluid in the internal of the injection mixer 1.

In addition, the adjusting module 12 may preferably include a transmission member 120 and a driving member 121. The transmission member 120 may have a rod-like structure, and the transmission member 120 may be disposed to penetrate the valve seat module 11 and the injection module 10. One end of the transmission member 120 may be movably connected to the injection module 10. One end of the driving member 121 may be connected to the other end of the transmission member 120. When the driving member 121 is driven to propel the transmission member 120 to rotate in a first direction, the transmission member 120 may in turn move the injection module 10 towards the valve seat module 11, and the annular protrusion 100 may approach the inner wall of the bucket container 2, such that the size of the predetermined gap a is reduced. On the contrary, when the driving member 121 is driven to propel the transmission member 120 to rotate in a second direction, the transmission member 120 may in turn move the injection module 10 away from the valve seat module 11, and the annular protrusion 100 may move away from the inner wall of the bucket container 2, such that the size of the predetermined gap a is increased.

For instance, the adjusting module 12 of the present disclosure may further include a transmission member 120 and a driving member 121. The transmission member 120 may have a rod-like structure, such as a pivot shaft, which may be disposed to penetrate the valve seat module 11 and the injection module 10. In particular, a washer may be interposed between the transmission member 120 and the valve seat module 11, and one end of the transmission member 120 may be movably connected to the injection module 10 by means of screw. The other end of the transmission member 120 may be connected to the driving member 121, which may be a turning handle, but the present disclosure is not limited thereto. Therefore, whenever the size of the predetermined gap a is to be reduced, the driving member 121 may be displaced such that the driving member 121 propels the transmission member 120 to rotate in the first direction (clockwise or anticlockwise). When the transmission member 120 is rotating, one end of the transmission member 120 may move closer to the injection module 10. Since the transmission member 120 is unable to move in axial direction, the injection module 10 may be pulled by the reaction force from the transmission member 120 and move towards the valve seat module 11, such that the annular protrusion 100 may move towards the inner wall of the bucket container 2, and the size of the predetermined gap a may be reduced.

Conversely, whenever the size of the predetermined gap a is to be increased, the driving member 121 may be displaced such that the driving member 121 propels the transmission member 120 to rotate in the second direction (opposite to the first direction). When the transmission member 120 is rotating, one end of the transmission member 120 may move further from the injection module 10. Since the transmission member 120 is unable to move in axial direction, the injection module 10 may be pushed by the reaction force from the transmission member 120 and move away from the valve seat module 11, such that the annular protrusion 100 may move away from the inner wall of the bucket container 2, and the size of the predetermined gap a may be increased.

It is worth noting that, the transmission member 120 may be directly disposed to penetrate part of the body of the fluid intake channel 102 and part of the body of the outlet channel 111. Alternatively, the center of the injection module 10 and the valve seat module 11 may be disposed with a passageway to accommodate the transmission member 120. The passageway may pass through part of the body of the fluid intake channel 102 and part of the body of the outlet channel 111. The wall of the passageway may separate the transmission member 120, the fluid intake channel 102, and outlet channel 111. Alternatively, the position where the fluid intake channel 102 and the outlet channel 111 are disposed may not coincide with the position where the transmission member 120 is located in the injection module 10 and the valve seat module 11.

Figure 4:
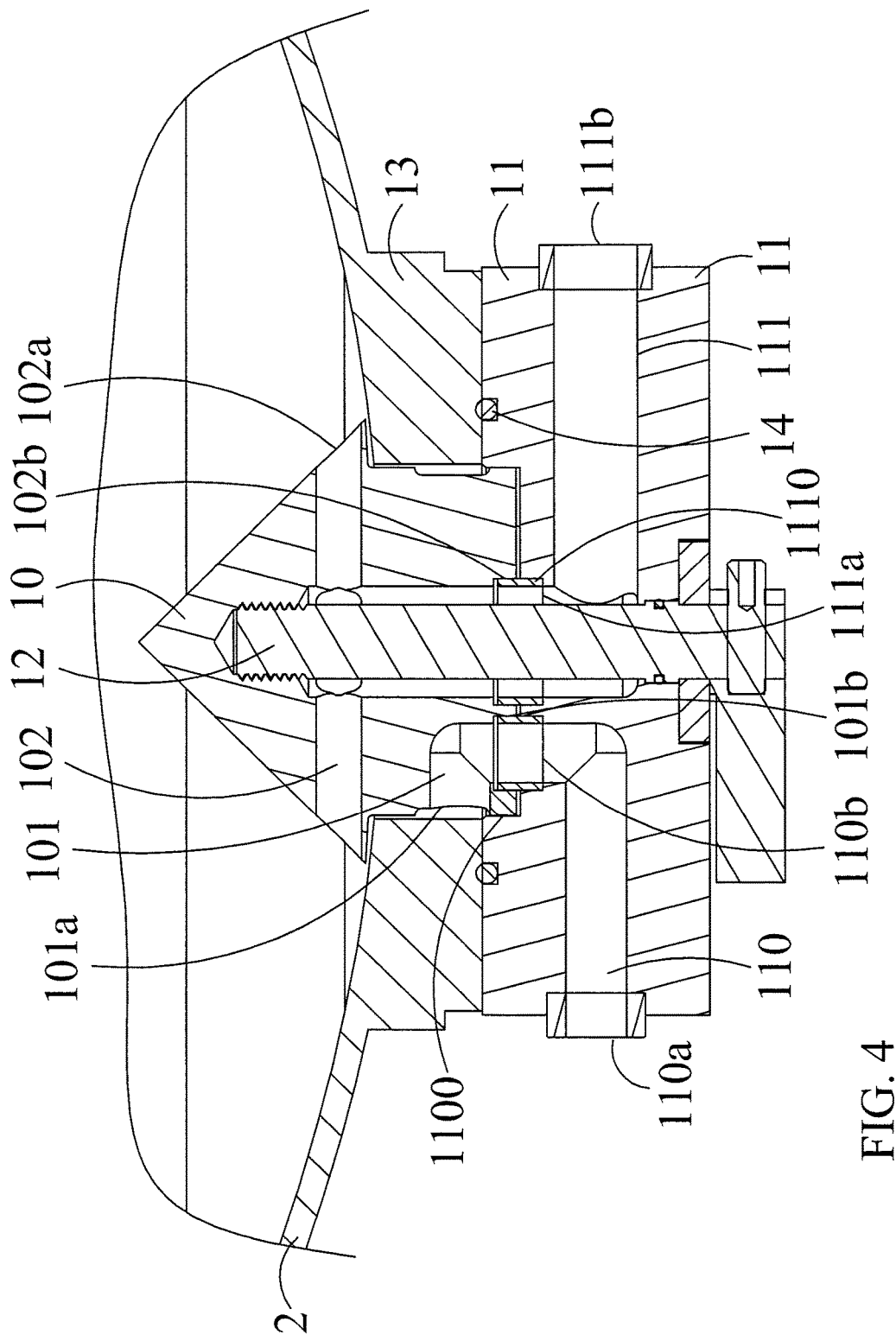
FIG. 4 is the schematic diagram for the third embodiment according to the injection mixer of the present disclosure.

The description below makes reference to FIG. 4, which is the schematic diagram for the third embodiment according to the injection mixer of the present disclosure, and FIGS. 1-3 should be incorporated into the reference as well. In the drawing, those components in the injection mixer of the present embodiment functioning in similar fashion as those of the previous embodiment are designated with similar labels, and hence their descriptions are omitted. It is worth noting that, in the present embodiment, the at least one injection channel 101 may be disposed with a fluid intake opening 101a and a fluid discharge opening 101b. The fluid intake opening 101a may be located at one end of the injection module 10, and the fluid discharge opening 101b may be located at one side of the injection module 10. In a preferred embodiment, the fluid supply channel 110 may be disposed with a fluid supply opening 110a and a fluid transporting opening 110b. The fluid supply opening 110a may be disposed at one side of the valve seat module 11, and the fluid transporting opening 110b may be disposed at one end of the valve seat module 11. Furthermore, the fluid transporting opening 110b may protrude outwards to form an engagement portion 1100 that may movably engage the fluid intake opening 101a.

Furthermore, the fluid intake channel 102 may be disposed with a guiding entrance 102a and a guiding exit 102b. The guiding entrance 102a may be disposed at the other end of the injection module 10, and the guiding exit 102b may be disposed at one end of the injection module 10. In a preferred embodiment, the at least one outlet channel 111 may be disposed with an inlet 111a and an outlet 111b. The inlet 111a may be disposed at one end of the valve seat module 11, and the outlet 111b may be disposed at the other side of the valve seat module 11. Furthermore, the inlet 111a may protrude outwards to form an engagement member 1110, and the engagement member 1110 may movably engage the guiding exit 102b.

More specifically, the injection channel 101 of the present disclosure may be disposed with a fluid intake opening 101a on one edge of the injection module 10 and a fluid discharge opening 101b on one side of the injection module 10. In addition, the at least one fluid supply channel 110 may form a fluid supply opening 110a on one side of the valve seat module 11 and a fluid transporting opening 110b on one edge of the valve seat module 11. The fluid transporting opening 110b may protrude outwards to form an engagement portion 1100, which may movably engage the fluid intake opening 101a. Therefore, after the fluid supply opening 110a has received the external fluid 3, the external fluid 3 may be transported to the fluid intake opening 101a through the fluid transporting opening 110b, and the external fluid 3 may then be discharged to the external of the injection module 10 through the fluid discharge opening 101b. By engaging the fluid intake opening 101a using the engagement portion 1100, the injection module 10 may perform no rotation when the transmission member 120 is driving the operation of the injection module 10.

In addition, the fluid intake channel 102 of the present disclosure may also form a guiding entrance 102a on the other end of the injection module 10 and a guiding exit 102b on one end of the injection module 10. Furthermore, the at least one outlet channel 111 may also form an inlet 111a on one end of the valve seat module 11 and an outlet 111b on the other side of the valve seat module 11. Besides, the inlet 111a may also protrude outwards to form an engagement member 1110, and the engagement member 1110 may movably engage the guiding exit 102b. Therefore, after receiving the internal fluid 20, the guiding entrance 102a may transport the internal fluid 20 to the inlet 111a through the guiding exit 102b, and the internal fluid 20 may then be discharged out of the valve seat module 11 through the outlet 111b. By engaging the guiding exit 102b using the engagement member 1110, the injection module 10 may perform no rotation when the transmission member 120 is driving the operation of the injection module 10.

It is worth noting that, in each of the previously disclosed embodiments, The respective quantities for the injection channel 101, the fluid intake channel 102, the fluid supply channel 110, and the outlet channel 111 may be more than one. Besides, the injection channel 101, the fluid intake channel 102, the fluid supply channel 110, and the outlet channel 111 may be disposed in array formation or any other formations, and arrangement for those components in the present disclosure is not limited to the present disclosure.

While the present disclosure is described with some preferred embodiments, it is understood that many changes and modifications in the described embodiments can be carried out without departing from the scope and the spirit of the inventive concept that is intended to be limited only by the appended claims.

What is claimed is:

1. An injection mixer, comprising:
   an injection module disposed to penetrate an end of a bucket container, an edge of the injection module protruding outwards to form an annular protrusion, the annular protrusion being separated from an inner wall of the bucket container by a predetermined gap, the injection module being disposed with at least one injection channel and at least one fluid intake channel, the at least one injection channel connecting a side of the injection module and one end of the injection module, the at least one fluid intake channel connecting the other end of the injection module and the end of the injection module;
   a valve seat module located at the end of the injection module, the valve seat module being disposed with at least one fluid supply channel and at least one outlet channel, the at least one fluid supply channel connecting a side of the valve seat module and one end of the valve seat module, the at least one outlet channel connecting the other end of the valve seat module and the end of the valve seat module; and
   an adjusting module disposed at the valve seat module to penetrate therethrough, and movably connected to the injection module, when the adjusting module is driven to move the injection module towards the valve seat module, the annular protrusion approaches the inner wall of the bucket container, and a size of the predetermined gap is reduced; when the adjusting module is driven to move the injection module away from the valve seat module, the annular protrusion moves away from the inner wall of the bucket container, and the size of the predetermined gap is increased;
   wherein, the fluid supply channel receives external fluid and then supplies the external fluid to the injection channel, and the injection channel supplies the external fluid to the bucket container through the predetermined gap; when the fluid intake channel receives internal fluid from the bucket container, the fluid intake channel transports the internal fluid to the outlet channel, and the outlet channel discharges the internal fluid out of the valve seat module.

2. The injection mixer of claim 1, further comprising a fixing module located between the end of the bucket container and the end of the valve seat module, wherein the fixing module surrounds the injection module and is detachably connected to the bucket container and the valve seat module.

3. The injection mixer of claim 2, wherein the fixing module is a circular structure, and an inner wall of the fixing module and a sidewall of the injection module are separated by a predetermined distance.

4. The injection mixer of claim 2, further comprising a washer component, which is located between the fixing module and the valve seat module.

5. The injection mixer of claim 2, wherein the adjusting module comprises:
   a transmission member having rod-like structure, the transmission member is disposed to penetrate the valve seat module and the injection module, one end of the transmission member is movably connected to the injection module; and
   a driving member, one end thereof is connected to the other end of the transmission member;
   when the driving member is driven to propel the transmission member to rotate in a first direction, the transmission member in turn moves the injection module towards the valve seat module, and the annular protrusion approaches the inner wall of the bucket container, such that the size of the predetermined gap is reduced.

6. The injection mixer of claim 5, when the driving member is driven to propel the transmission member to rotate in a second direction, the transmission member in turn moves the injection module away from the valve seat module, and the annular protrusion moves away from the inner wall of the bucket container, such that the size of the predetermined gap is increased.

7. The injection mixer of claim 1, wherein the at least one injection channel is disposed with a fluid intake opening and a fluid discharge opening, the fluid intake opening is located at the end of the injection module, and the fluid discharge opening is located at the side of the injection module.

8. The injection mixer of claim 7, wherein the at least one fluid supply channel is disposed with a fluid supply opening and a fluid transporting opening, the fluid supply opening is located at the side of the valve seat module, and the fluid transporting opening is located at the end of the valve seat module.

9. The injection mixer of claim 8, wherein the fluid transporting opening protrudes outwards to form an engagement portion that movably engages the fluid intake opening.

10. The injection mixer of claim 1, wherein the at least one fluid intake channel is disposed with a guiding entrance and a guiding exit, the guiding entrance is located at the other end of the injection module, and the guiding exit is located at the end of the injection module.

11. The injection mixer of claim 10, wherein the at least one outlet channel is disposed with an inlet and an outlet, the inlet is located at the end of the valve seat module, and the outlet is located at the other side of the valve seat module.

12. The injection mixer of claim 11, wherein the inlet protrudes outwards to form an engagement member, and the engagement member movably engages the guiding exit.

13. The injection mixer of claim 1, wherein the end of the injection module and the annular protrusion are an integrally formed structure.

14. The injection mixer of claim 13, wherein the integrally formed structure forms a cone shape.

* * * * *